United States Patent
Bhardwaj et al.

(10) Patent No.: US 11,354,036 B2
(45) Date of Patent: Jun. 7, 2022

(54) METHOD AND ELECTRONIC DEVICE FOR CONFIGURING TOUCH SCREEN KEYBOARD

(71) Applicant: Samsung Electronics Co., Ltd., Gyeonggi-do (KR)

(72) Inventors: Gaurav Kumar Bhardwaj, Noida (IN); Mohit Kumar, Noida (IN); Sandeep Singh Spall, Noida (IN); Vinay Kumar, Noida (IN); Kaushal Prakash Sharma, Noida (IN); Prajeet Thakur, Noida (IN); Pramesh Dahiya, Noida (IN); Vipul Krishan Dhunna, Noida (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/263,755

(22) PCT Filed: Jun. 12, 2019

(86) PCT No.: PCT/KR2019/007064
§ 371 (c)(1),
(2) Date: Jan. 27, 2021

(87) PCT Pub. No.: WO2020/022645
PCT Pub. Date: Jan. 30, 2020

(65) Prior Publication Data
US 2021/0165568 A1 Jun. 3, 2021

(30) Foreign Application Priority Data
Jul. 27, 2018 (IN) .............................. 201841028363

(51) Int. Cl.
*G06F 3/04886* (2022.01)
*G06F 3/023* (2006.01)

(52) U.S. Cl.
CPC ........ *G06F 3/04886* (2013.01); *G06F 3/0238* (2013.01)

(58) Field of Classification Search
None
See application file for complete search history.

(56) References Cited

U.S. PATENT DOCUMENTS 8,345,008 B2  1/2013  Lee et al.
9,292,203 B2  3/2016  Winer
(Continued)

FOREIGN PATENT DOCUMENTS

CN   106097787   11/2016
EP   2 990 925    3/2016
(Continued)

OTHER PUBLICATIONS

PCT/ISA/210 Search Report issued on PCT/KR2019/007064, dated Sep. 20, 2019, pp. 3.
(Continued)

*Primary Examiner* — Aneeta Yodichkas
(74) *Attorney, Agent, or Firm* — The Farrell Law Firm, P.C.

(57) ABSTRACT

Embodiments herein provide a method for configuring a touch screen keyboard in an electronic device. The method includes identifying a type of one or more applications running in the electronic device. The method includes receiving an input event on the one or more applications. The method includes generating the touch screen keyboard based on the identified type of the at least one application in response to the input event. Further, the method includes displaying the touch screen keyboard on the screen of the electronic device.

16 Claims, 16 Drawing Sheets

(56) References Cited

U.S. PATENT DOCUMENTS

| | | | |
|---|---|---|---|
| 9,547,375 B2 | 1/2017 | Paek et al. | |
| 2009/0237359 A1 | 9/2009 | Kim et al. | |
| 2013/0283195 A1 | 10/2013 | Bilgen et al. | |
| 2013/0326347 A1* | 12/2013 | Albright | G06F 9/454 715/265 |
| 2014/0188606 A1 | 7/2014 | Moore et al. | |
| 2014/0281995 A1* | 9/2014 | Kim | G06F 3/04883 715/719 |
| 2017/0097765 A1* | 4/2017 | Chao | H04W 4/02 |
| 2017/0097948 A1 | 4/2017 | Kerr et al. | |
| 2018/0121085 A1 | 5/2018 | Park et al. | |
| 2020/0319794 A1 | 10/2020 | Eun et al. | |

FOREIGN PATENT DOCUMENTS

| | | |
|---|---|---|
| KR | 1020160101633 | 8/2016 |
| KR | 1020170081842 | 7/2017 |
| WO | WO2013085528 | 6/2013 |
| WO | WO2017217762 | 12/2017 |

OTHER PUBLICATIONS

PCT/ISA/237 Written Opinion issued on PCT/KR2019/007064, dated Sep. 20, 2019, pp. 6.
Indian Examination Report issued on Indian Patent Application No. 201841028363, dated Apr. 11, 2020, pp. 6.
European Search Report dated May 3, 2021 issued in counterpart application No. 19842110.9-1203, 7 pages.

* cited by examiner

[Fig. 1A]
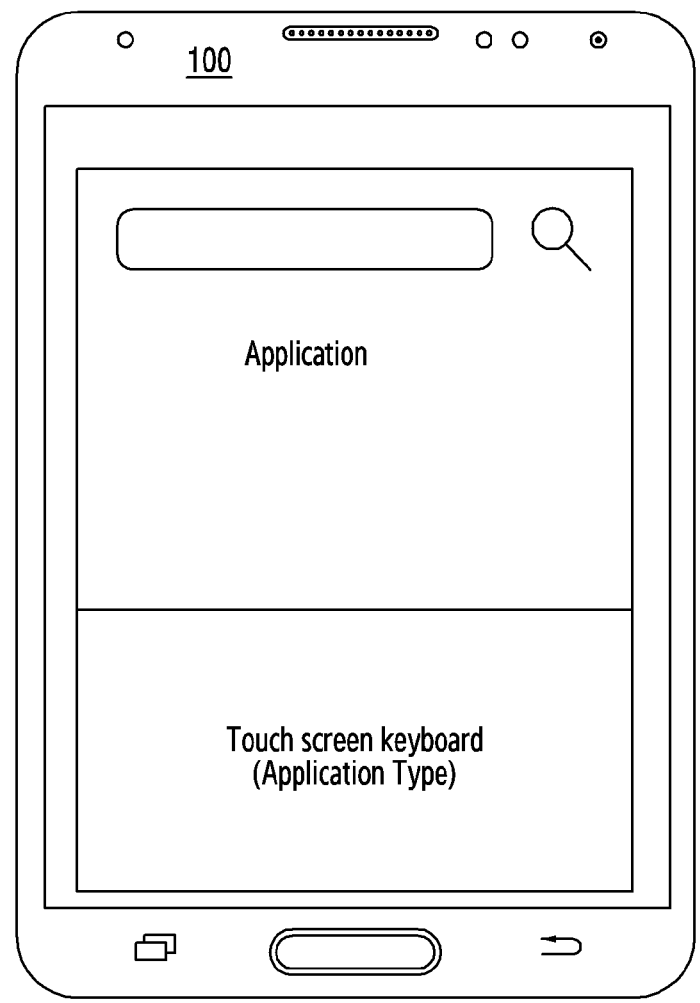

[Fig. 1B]
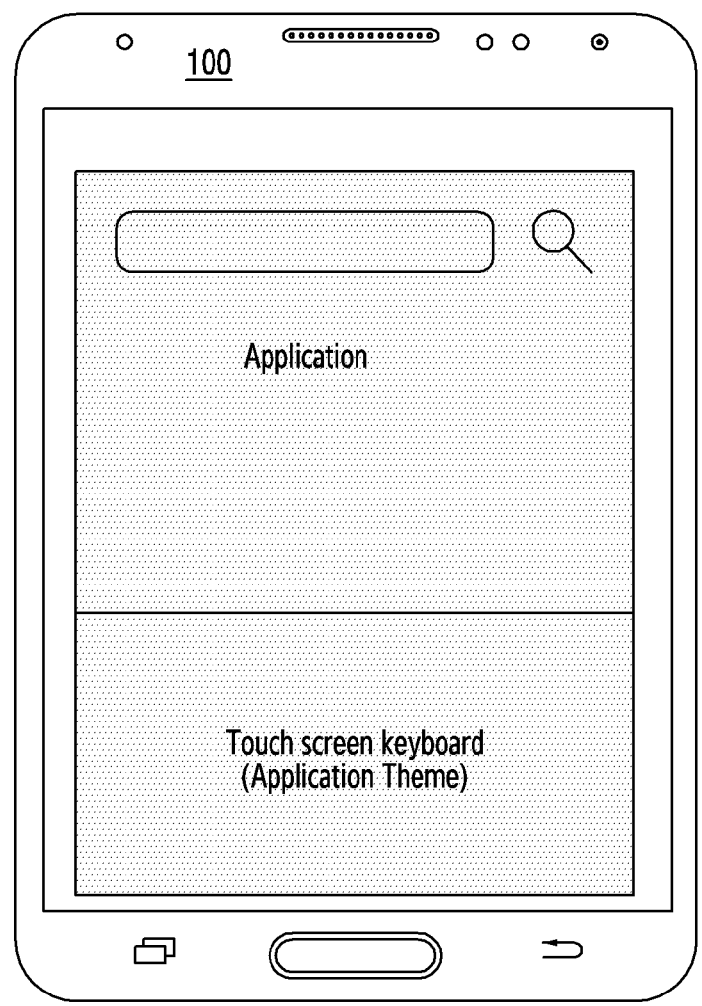

[Fig. 1C]
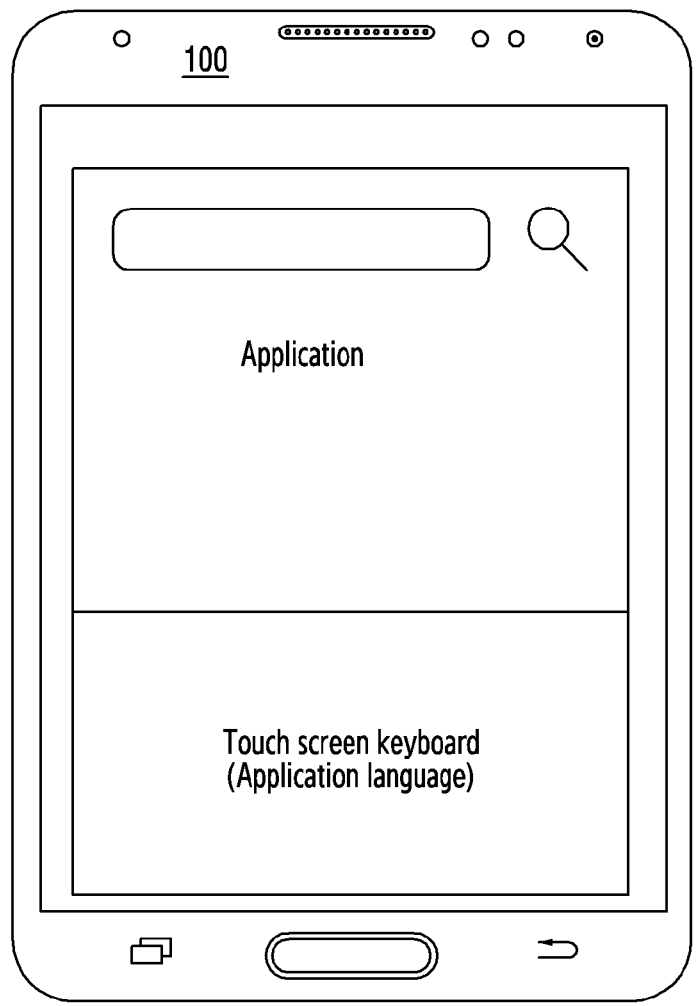
[Fig. 2A]
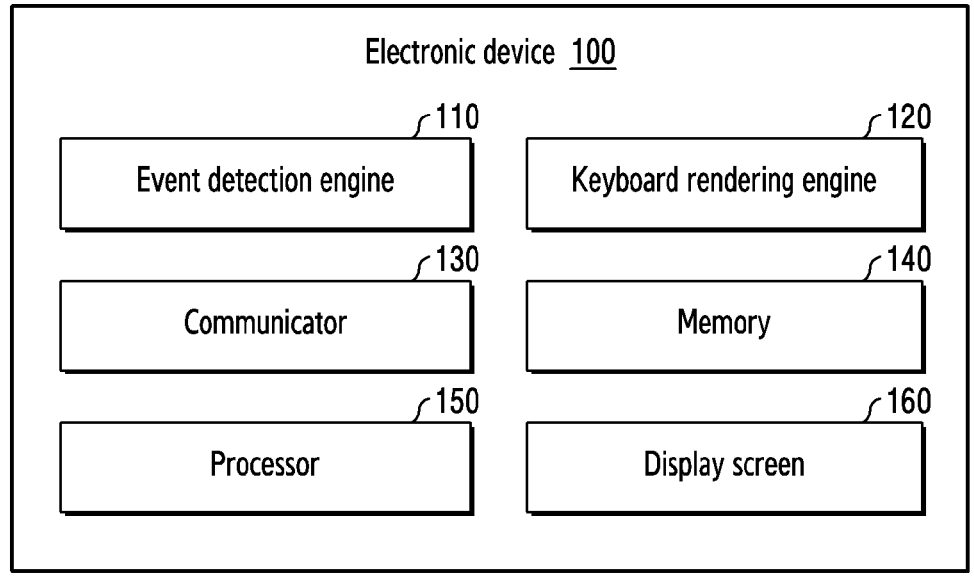

[Fig. 2B]
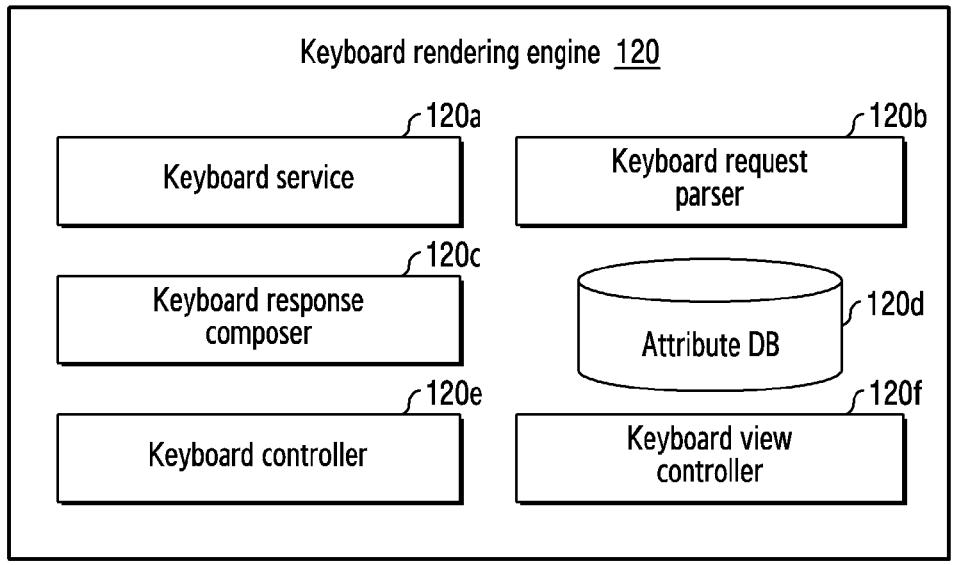
[Fig. 3]
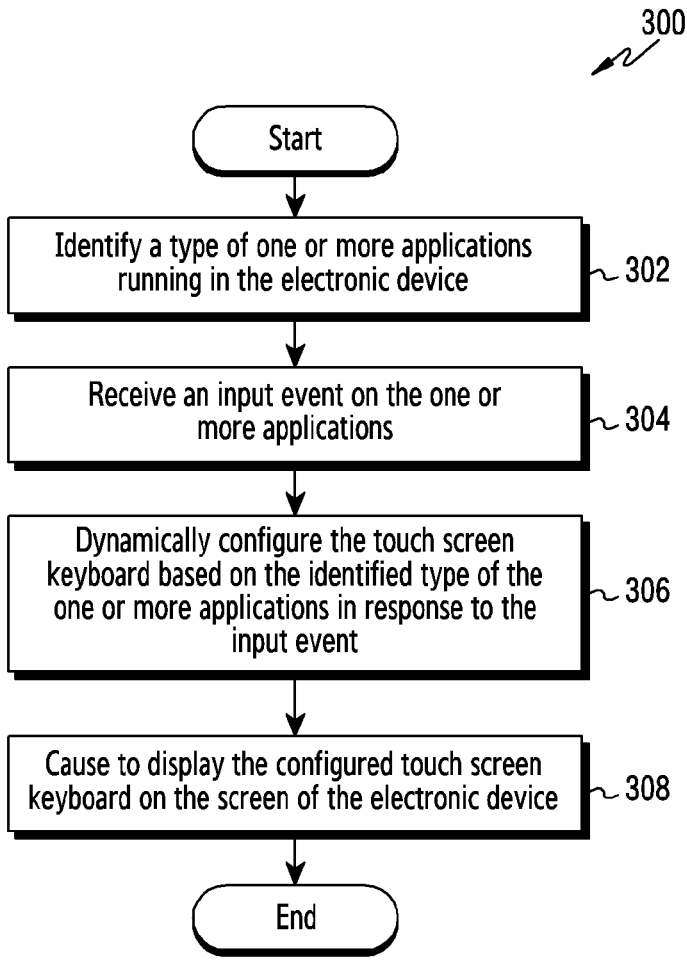

[Fig. 4]
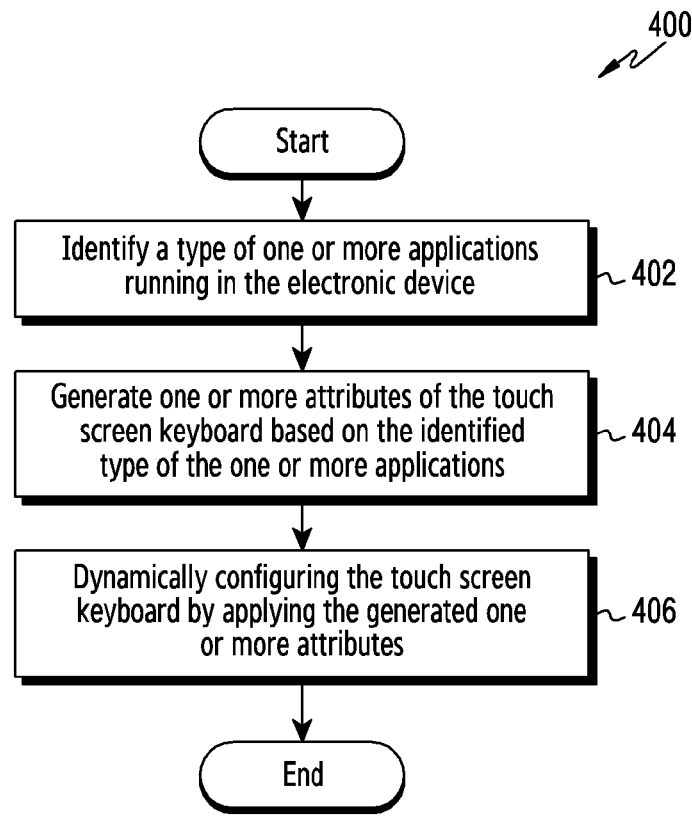
[Fig. 5]
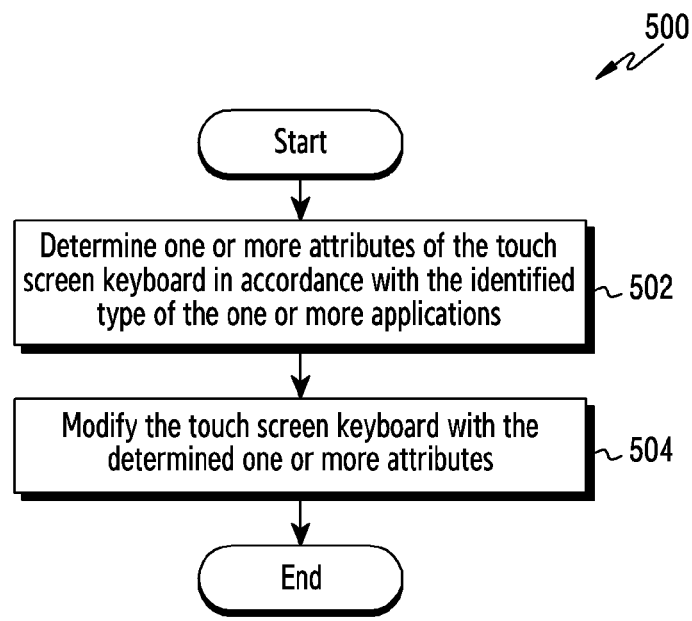

[Fig. 6A]
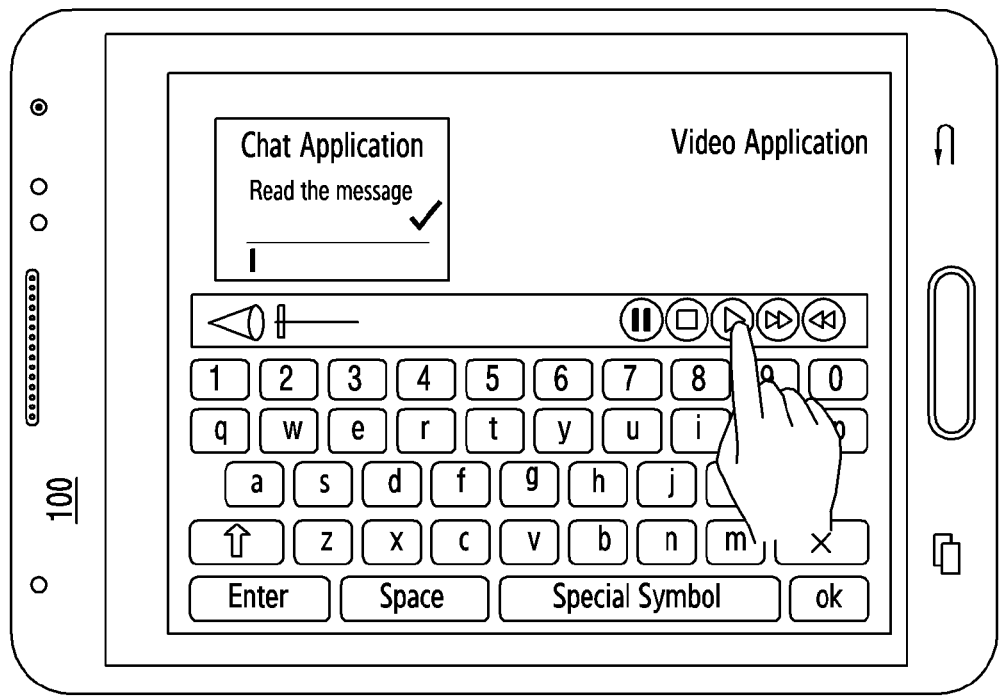
[Fig. 6B]
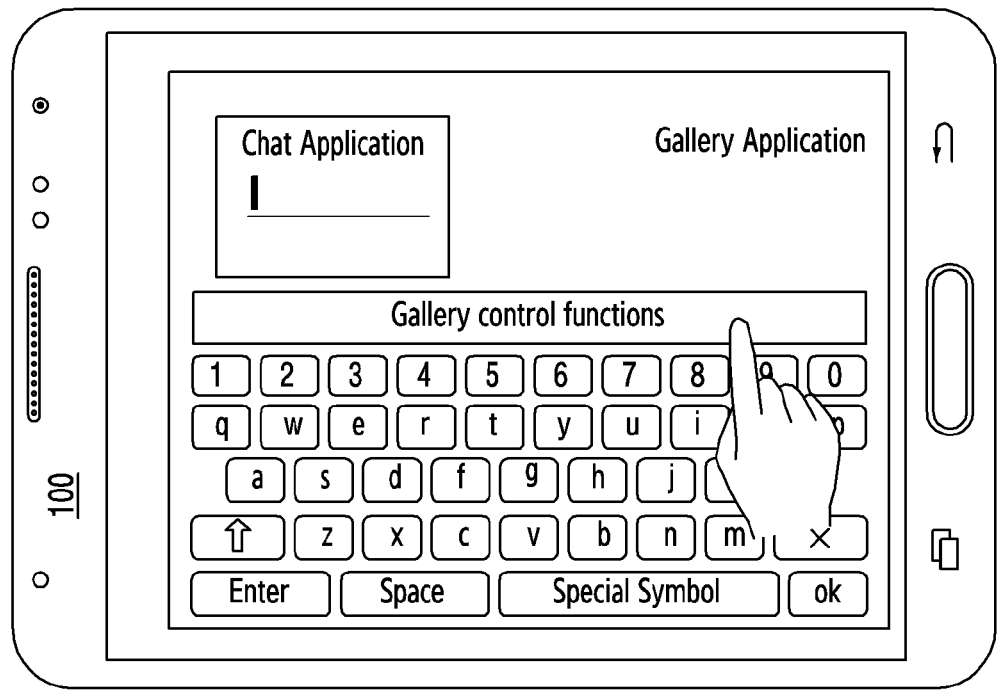

[Fig. 7]
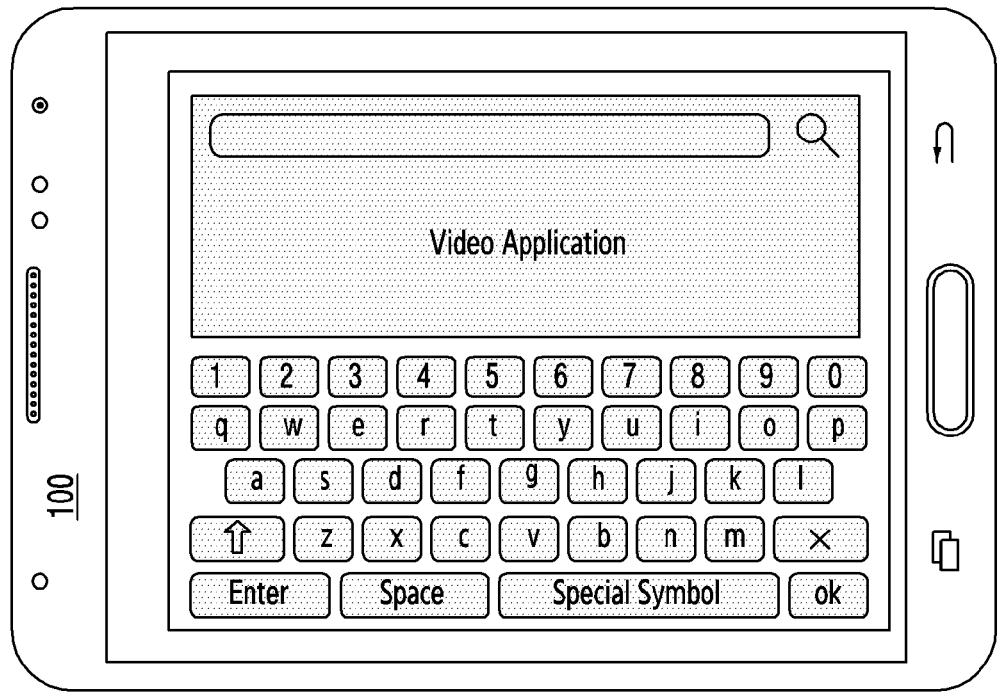
[Fig. 8]
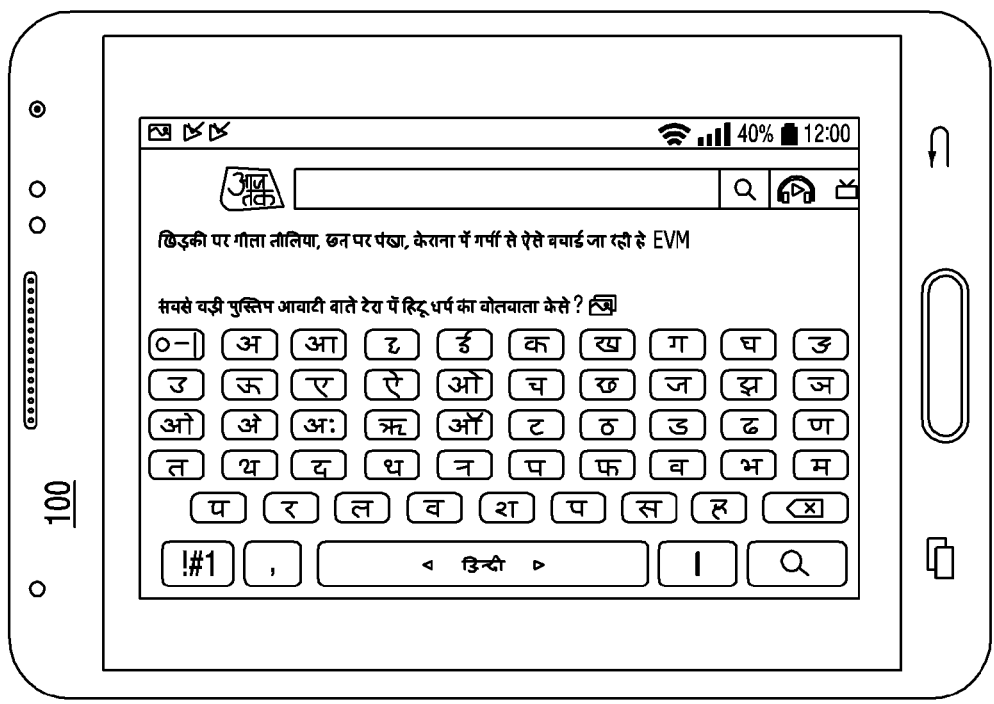

[Fig. 9A]
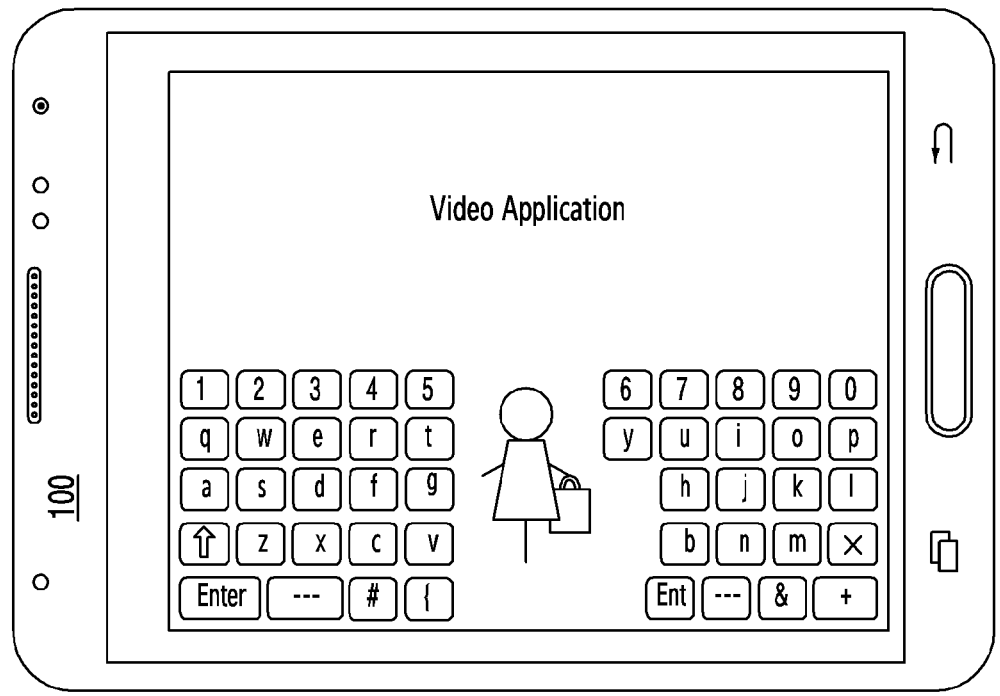
[Fig. 9B]
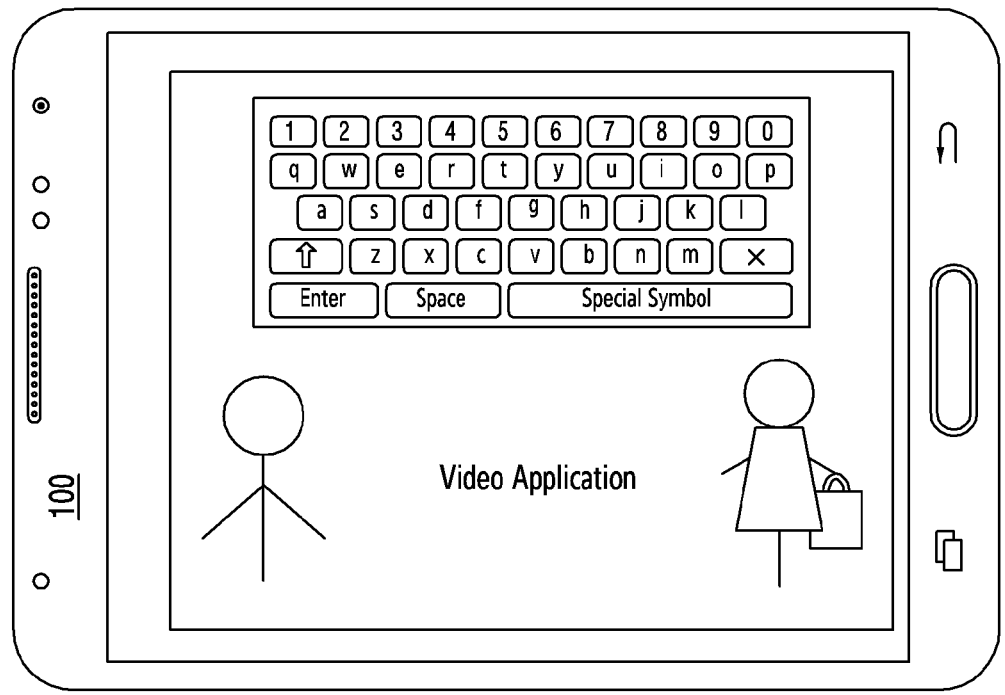

[Fig. 10A]
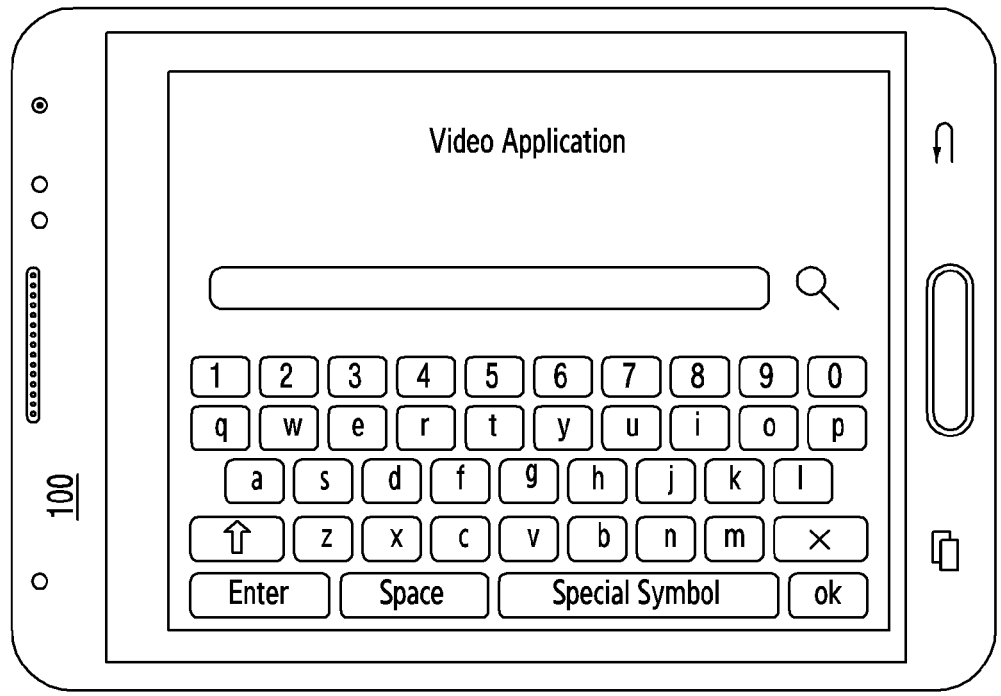
[Fig. 10B]
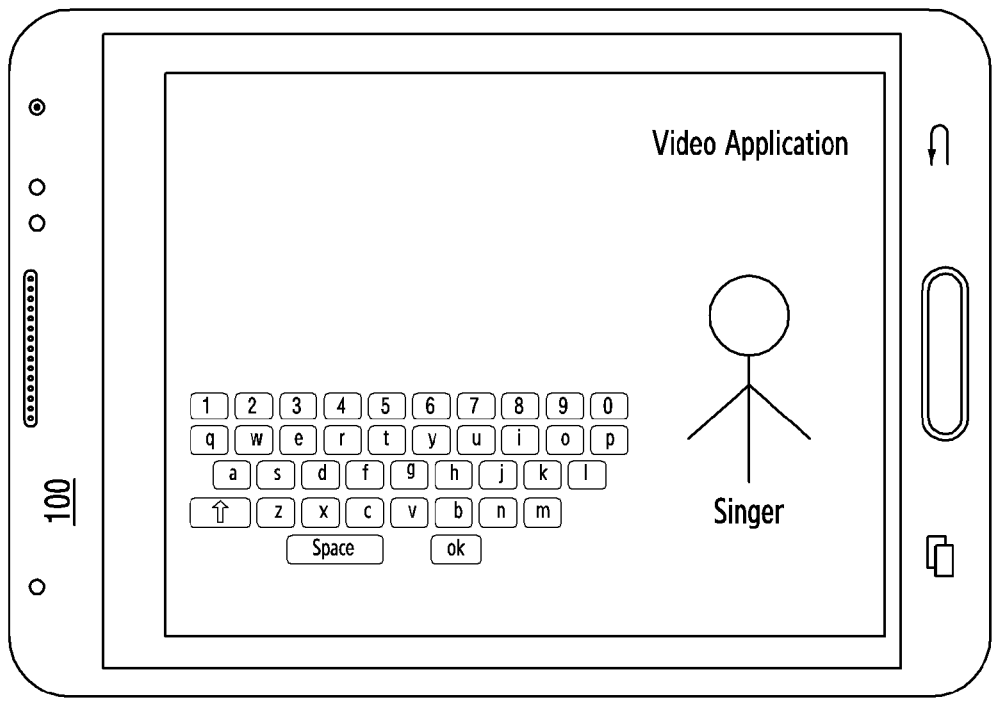

[Fig. 11]
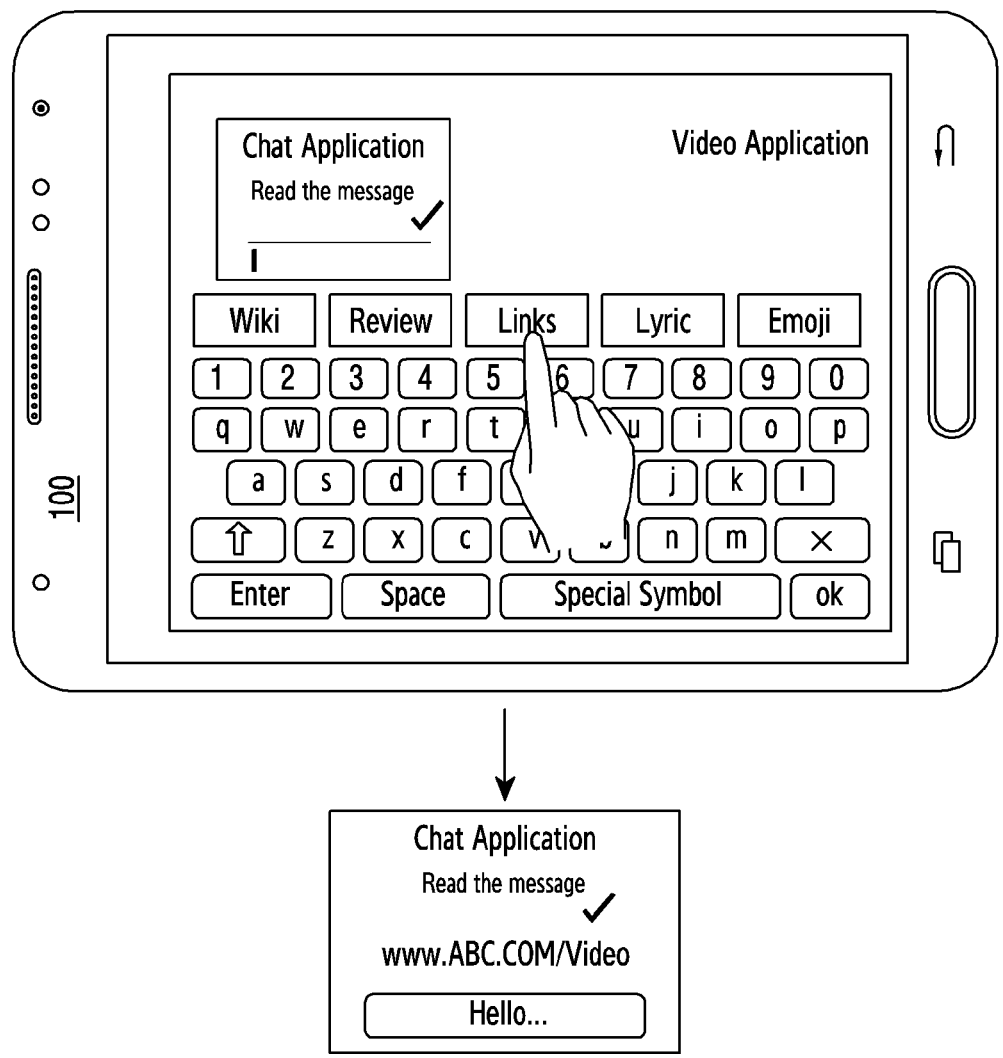

[Fig. 12]
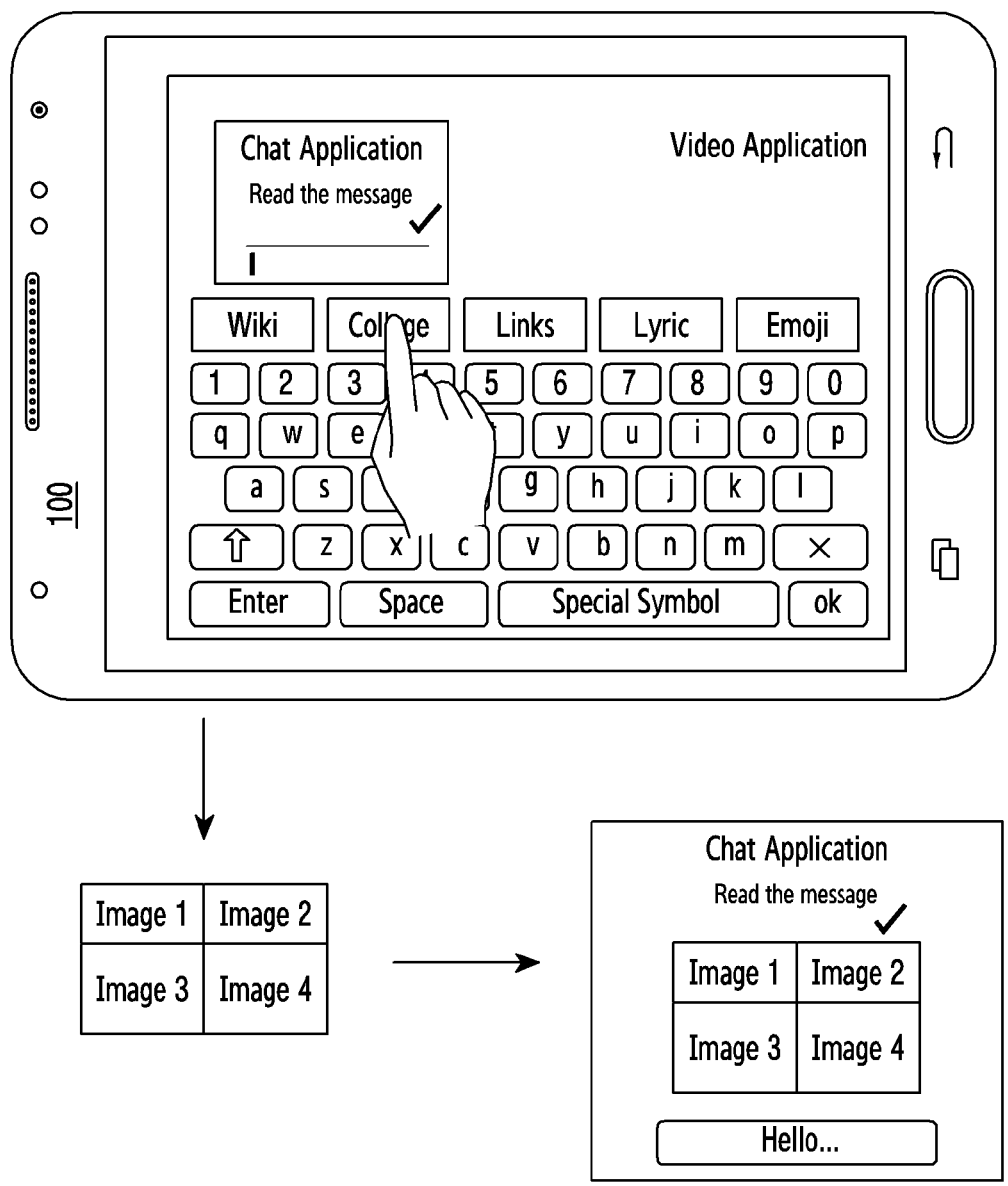

[Fig. 13A]
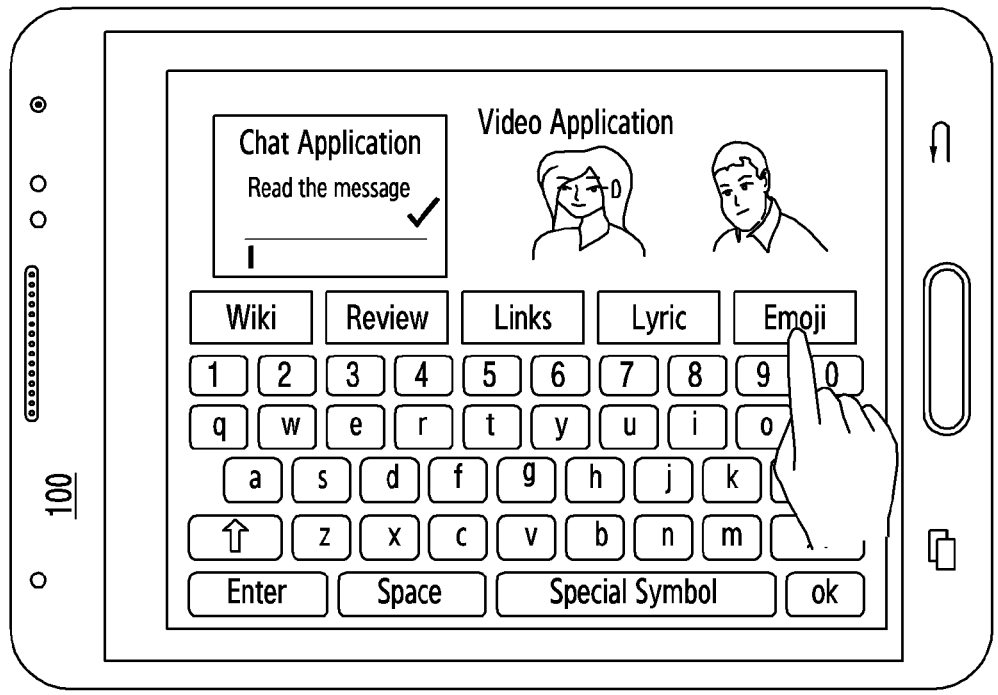
[Fig. 13B]
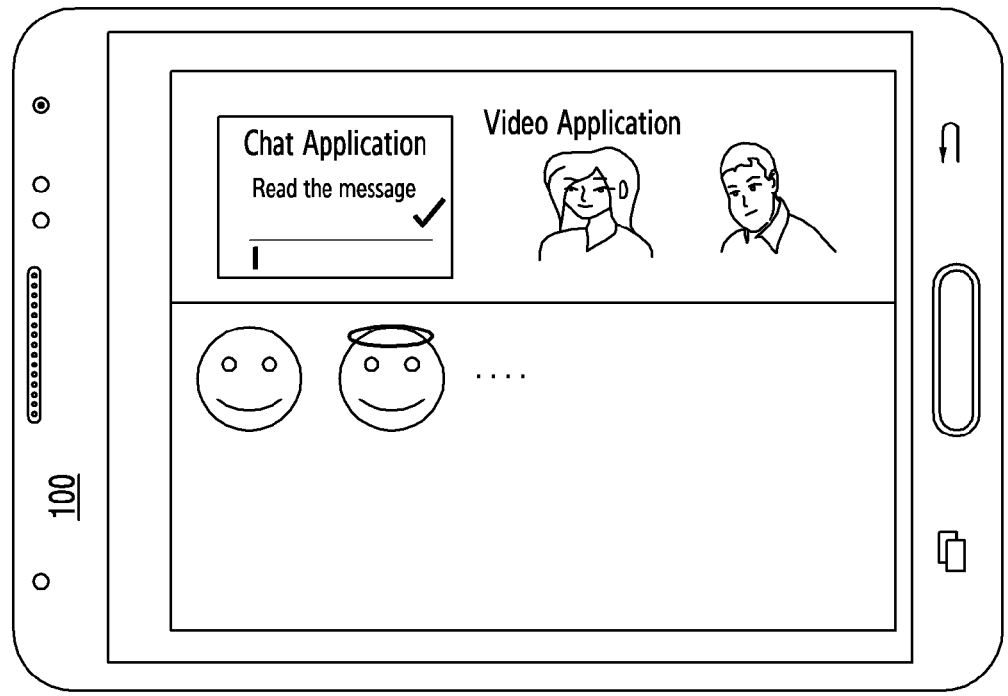

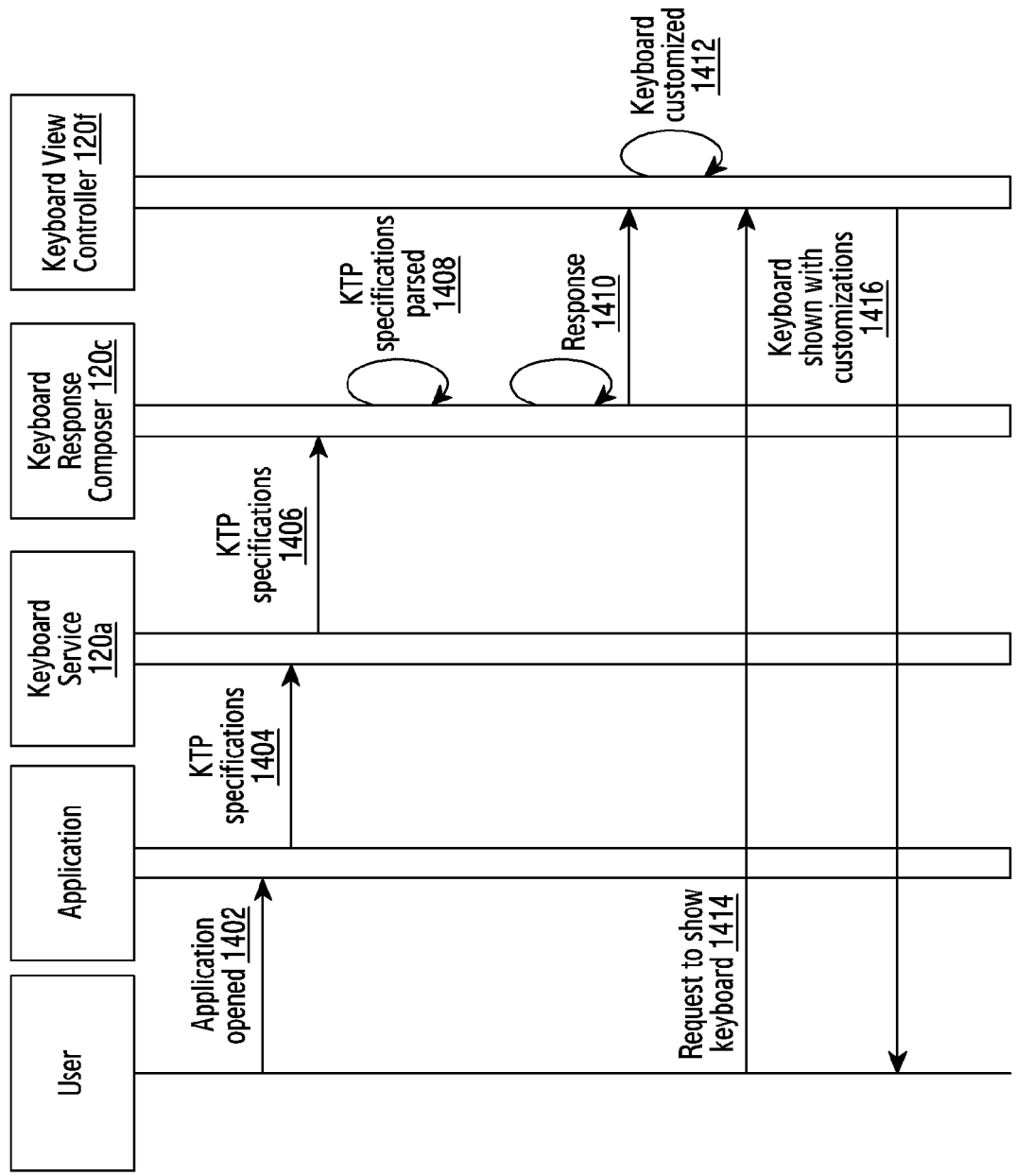
[Fig. 14]

[Fig. 15]
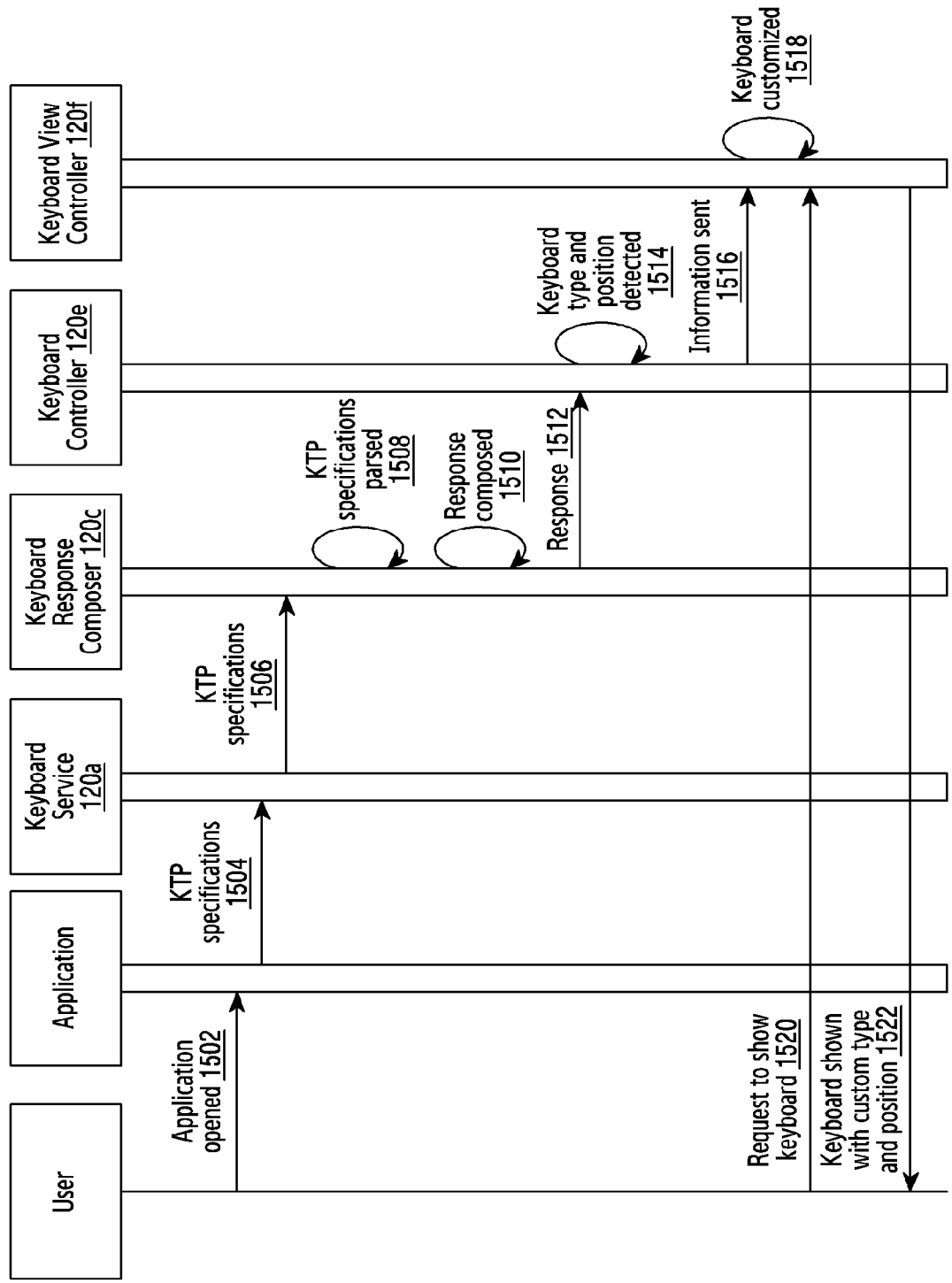

[Fig. 16]
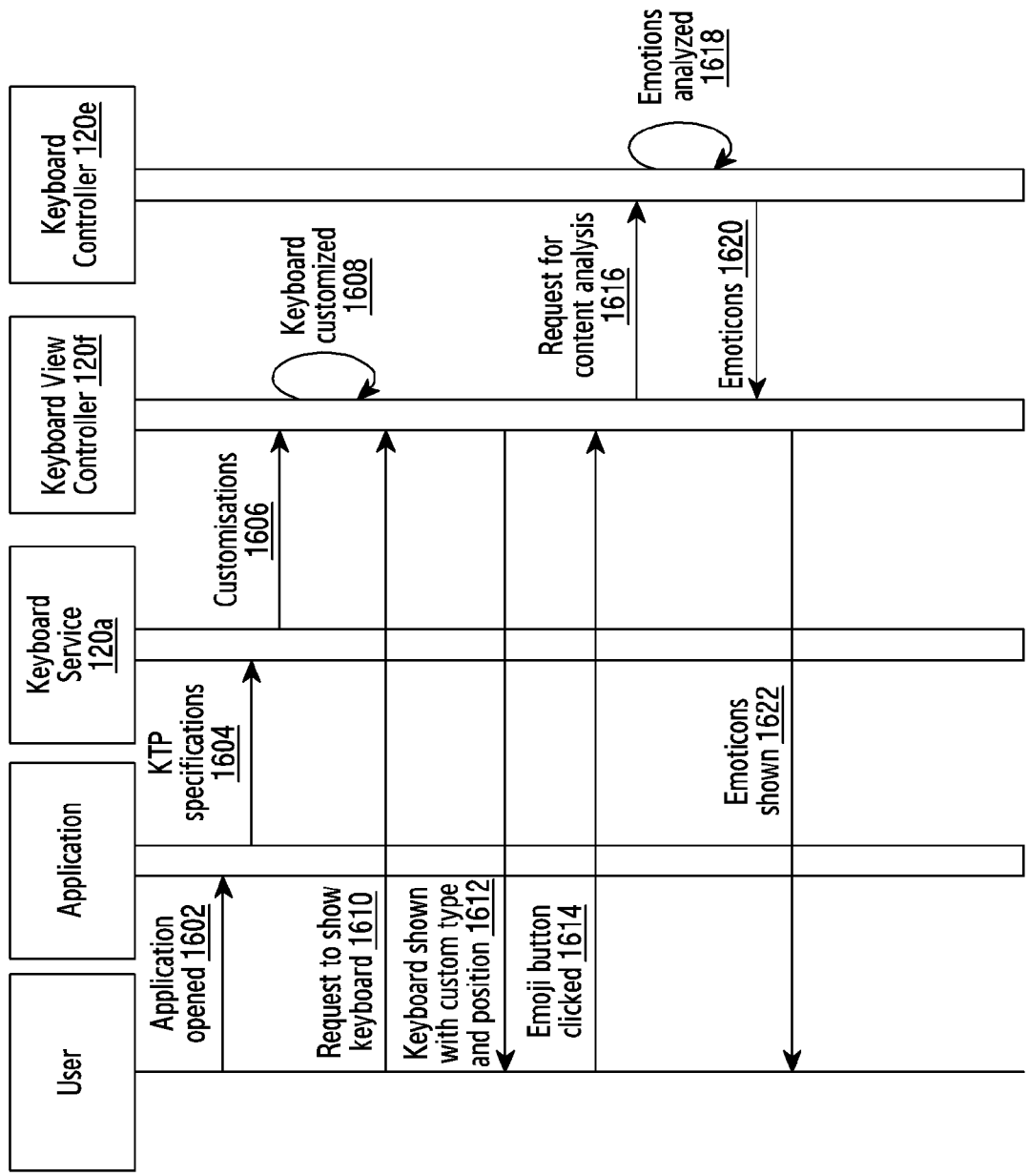

[Fig. 17]
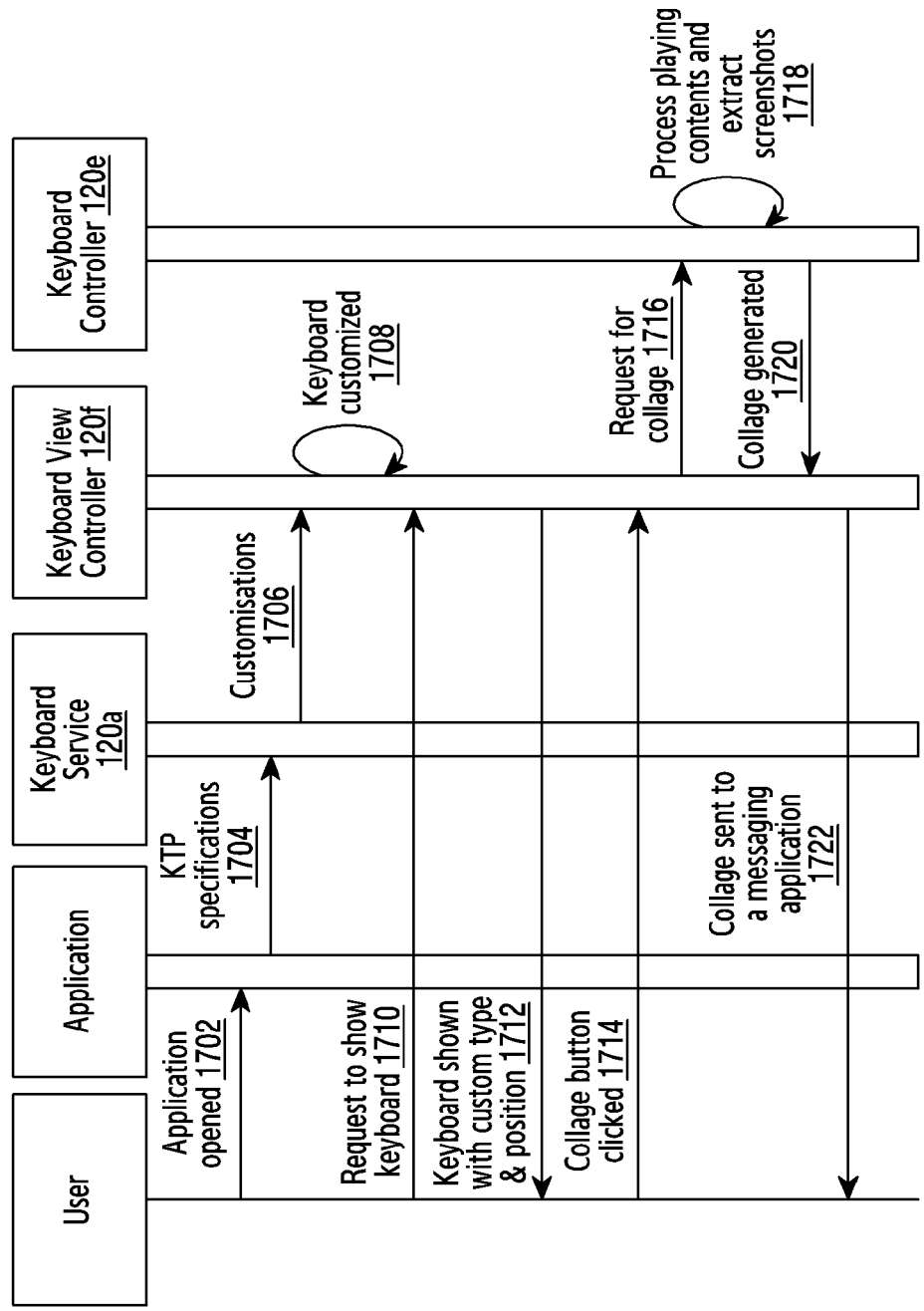

METHOD AND ELECTRONIC DEVICE FOR CONFIGURING TOUCH SCREEN KEYBOARD

PRIORITY

This application is a National Phase Entry of International Application No. PCT/KR2019/007064, which was filed on Jun. 12, 2019, and claims priority to Indian Patent Application No. 201841028363, filed in the Indian Intellectual Property Office on Jul. 27, 2018, the content of each of which is incorporated herein by reference.

TECHNICAL FIELD

The present disclosure relates to electronic devices. More particularly it is related to a method and electronic device for configuring a touch screen keyboard.

BACKGROUND ART

In general, electronic devices dominate all aspects of modern life. Over a period of time, the manner in which the electronic devices display information on a user interface has become intelligent, efficient, and less obtrusive.

The electronic devices such as for example, a mobile phone, a portable game console or the like provides a user interface that includes an on-screen keyboard which allows a user to enter input (i.e., a text) into the user interface by touching virtual keys displayed on a touch screen display. Typically, the on-screen keyboard is a system keyboard that is provided by the operating system of the electronic device. In addition to providing the system keyboard, the operating system of the device handles the display behavior of the system keyboard.

In some existing methods, keyboard layouts are modified that increase user comfort, efficiency and accuracy. Further, the virtual keyboards have been developed with separate left and right groupings of keys. Furthermore, some virtual keyboards have been developed that permit groups of keys to be moved, resized and rotated by a user to position the keys. In other existing systems, user interaction with a virtual keyboard is tracked and the positions of keys based are adjusted upon the user's interaction with the keyboard.

Many applications may require customizations of the keyboard. For example, a gaming application may require a specific theme keyboard or a regional application may require opening the keyboard in a particular language. Thus, a substantial need continues to exist for a manner of improving the efficiency, comfort and accuracy of touch screen keyboards.

The above information is presented as background information only to help the reader to understand the present invention. Applicants have made no determination and make no assertion as to whether any of the above might be applicable as Prior Art with regard to the present application.

DISCLOSURE OF INVENTION

Solution to Problem

Accordingly the embodiments herein provide a method for configuring a touch screen keyboard in an electronic device. The method includes identifying a type of one or more applications running in the electronic device. The method includes receiving an input event on the one or more applications. Further, the method includes dynamically configuring the touch screen keyboard based on the identified type of the one or more applications in response to the input event.

Accordingly the embodiments herein provide a method for configuring a touch screen keyboard in an electronic device. The method includes identifying a type of one or more applications running in the electronic device. The method includes generating one or more attributes of the touch screen keyboard based on the identified type of the one or more applications. Further, the method includes dynamically configuring the touch screen keyboard by applying the generated one or more attributes.

Accordingly the embodiments herein provide an electronic device for configuring a touch screen keyboard, the electronic device. The electronic device includes a memory, a processor coupled to the memory and a keyboard rendering engine coupled to the memory and the processor. The keyboard rendering engine is configured to identify a type of one or more applications running in the electronic device. The keyboard rendering engine is configured to receive an input event on the one or more applications. Further, the keyboard rendering engine is configured to dynamically configure the touch screen keyboard based on the identified type of the one or more applications in response to the input event.

Accordingly the embodiments herein provide an electronic device for configuring a touch screen keyboard. The electronic device includes a memory, a processor coupled to the memory and a keyboard rendering engine coupled to the memory and the processor. The keyboard rendering engine is configured to identify a type of one or more applications running in the electronic device. The keyboard rendering engine is configured to generate one or more attributes of the touch screen keyboard based on the identified type of the one or more applications. Further, the keyboard rendering engine is configured to dynamically configure the touch screen keyboard by applying the generated one or more attributes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1A is example illustration in which a touch screen keyboard is dynamically configured based on an application(s) running in an electronic device, according to embodiments as disclosed herein;

FIG. 1B is another example illustration in which a touch screen keyboard is dynamically configured based on an application(s) running in an electronic device, according to embodiments as disclosed herein;

FIG. 1C is another example illustration in which a touch screen keyboard is dynamically configured based on an application(s) running in an electronic device, according to embodiments as disclosed herein;

FIG. 2A is a block diagram of an electronic device, according to an embodiment as disclosed herein;

FIG. 2B illustrates various components of a keyboard rendering engine in the electronic device, according to an embodiment as disclosed herein;

FIG. 3 is a flow diagram illustrating a method for configuring a touch screen keyboard in an electronic device, according to an embodiment as disclosed herein;

FIG. 4 is a flow diagram illustrating another method for configuring a touch screen keyboard in an electronic device, according to an embodiment as disclosed herein;

FIG. 5 is a flow diagram illustrating a method for modifying the touch screen keyboard with determined attributes, according to an embodiment as disclosed herein;

FIG. 6A is example illustration in which the touch screen keyboard is displayed along with controlling functions associated with the applications running in the electronic device, according to an embodiment as disclosed herein;

FIG. 6B is another example illustration in which the touch screen keyboard is displayed along with controlling functions associated with the applications running in the electronic device, according to an embodiment as disclosed herein;

FIG. 7 is an example illustration in which the touch screen keyboard is displayed in accordance with a theme of the application, according to an embodiment as disclosed herein;

FIG. 8 is an example illustration in which the touch screen keyboard is displayed in accordance with a language of the application, according to an embodiment as disclosed herein;

FIG. 9A is example illustration in which the touch screen keyboard is displayed as a split keyboard and a floating keyboard, according to an embodiment as disclosed herein;

FIG. 9B is another example illustration in which the touch screen keyboard is displayed as a split keyboard and a floating keyboard, according to an embodiment as disclosed herein;

FIG. 10A is example illustration of positioning the touch screen keyboard based on content of the application, according to an embodiment as disclosed herein;

FIG. 10B is example illustration of positioning the touch screen keyboard based on content of the application, according to an embodiment as disclosed herein;

FIG. 11 is an example illustration in which a video link is shared through a chat application using one or more buttons on the touch screen keyboard, according to an embodiment as disclosed herein;

FIG. 12 is an example illustration in which a collage of images is shared through a chat application using one or more buttons on the touch screen keyboard, according to an embodiment as disclosed herein;

FIG. 13A is example illustration in which a plurality of emoticons are provided on interaction with one or more buttons on the touch screen keyboard, according to an embodiment as disclosed herein;

FIG. 13B is another example illustration in which a plurality of emoticons are provided on interaction with one or more buttons on the touch screen keyboard, according to an embodiment as disclosed herein;

FIG. 14 is a sequence diagram illustrating various steps involved in providing a configurable touch screen keyboard based on application running in the electronic device, according to an embodiment as disclosed herein;

FIG. 15 is a sequence diagram illustrating various steps involved in configuring the position of the touch screen keyboard, according to an embodiment as disclosed herein;

FIG. 16 is a sequence diagram illustrating various steps involved in providing a plurality of emoticons on interaction with one or more buttons on the touch screen keyboard, according to an embodiment as disclosed herein; and FIG. 17 is a sequence diagram illustrating various steps involved in sharing a collage of images through a chat application using one or more buttons on the touch screen keyboard, according to an embodiment as disclosed herein.

BEST MODE FOR CARRYING OUT THE INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the description, the terms keyboard and the touch screen keyboard will have the same meaning and are used interchangeably.

Accordingly the embodiments herein provide a method for configuring a touch screen keyboard in an electronic device. The method includes identifying a type of one or more applications running in the electronic device. The method includes receiving an input event on the one or more applications. Further, the method includes dynamically configuring the touch screen keyboard based on the identified type of the one or more applications in response to the input event. Furthermore, the method includes causing to display the configured touch screen keyboard on the screen of the electronic device.

In an embodiment, the touch screen keyboard includes at least one of a QWERTY keyboard, a handwriting panel with a plurality of buttons and a voice input method editor (IME).

In an embodiment, dynamically configuring the touch screen keyboard based on the identified type of the one or more applications in response the input event includes determining one or more attributes of the touch screen keyboard in accordance with the identified type of the one or more applications. Further, the method includes modifying the touch screen keyboard with the determined one or more attributes. The one or more attributes include a layout type, position, number of rows, number of columns, width, height, theme, language preference, mode of the touch screen keyboard (such as normal mode, split keyboard and floating keyboard) and buttons.

In various embodiments, the method includes identifying a type of one or more applications running in the electronic device. The method includes generating one or more attributes of the touch screen keyboard based on the identified type of the one or more applications. Further, the method includes dynamically configuring the touch screen keyboard by applying the generated attributes.

Unlike the conventional methods and systems, the proposed method can be used to provide a dynamic touch screen keyboard based on requirements of the application. The touch screen keyboard is modified dynamically in accordance with the requirements of the application. The attributes of the keyboard such as a layout type, position, number of rows, number of columns, width, height, theme, language preference, mode of the touch screen keyboard and buttons are dynamically modified in accordance with the application type and the request received from the application.

The touch screen keyboard is modified by providing one or more buttons for interaction with the applications using the determined attributes. Various example illustrations are provided for better understanding in conjunction with figures for better understanding of the present disclosure.

The proposed method can be used to enhance the user experience, where the user can use keyboard smartly based on the application context. In some example embodiments, the proposed method can be used to enhance the utility of transparent keyboard in a messaging application over a video feature.

Referring now to the drawings and more particularly to FIGS. 1A through 17, where similar reference characters denote corresponding features consistently throughout the figures, there are shown preferred embodiments.

FIGS. 1A-1C are example illustrations in which is touch screen keyboard is dynamically configured based on an application(s) running in an electronic device 100, according to embodiments as disclosed herein.

The electronic device 100 can be, for example, but not limited to a cellular phone, a smart phone, a Personal Digital Assistant (PDA), a tablet computer, a laptop computer, a smart watch, a smart glass or the like.

In an embodiment, the touch screen keyboard can be displayed on the type of application running in the electronic device 100 as shown in the FIG. 1A. The touch screen keyboard is dynamically configured based on the type of application running in the electronic device 100 (i.e., the keyboard attributes such as but not limited to height and width are configured based on the type of the application). Thus, the touch screen board is dynamically configured in accordance with the requirements of the application.

In another embodiment, various buttons of the touch screen keyboard are displayed by applying a theme of the application running in the electronic device, as shown in the FIG. 1B. For example, the theme of the application is blue, then the various buttons of the touch screen keyboard are displayed in blue. Thus, the touch screen keyboard can be configured in accordance with the theme of the application.

In yet another embodiment, the touch screen keyboard can be configured based on a language of the application being accessed in the electronic device 100 as shown in the FIG. 1C. For example, the language of the application is Hindi, then the touch screen keyboard can be displayed in Hindi language.

The FIGS. 1A-1C depicts only few embodiments of the present disclosure. It is to be understood that the other embodiments are not limited thereto. The various embodiments are depicted in conjunction with figures in the later parts of the description.

Thus, with the proposed method, the touch screen keyboard can be dynamically configurable based on the type of the application running in the electronic device. Various example illustrations in which the touch screen keyboard is dynamically configured are described in conjunction with figures. Although not shown in the FIGS. 1A-1C, the touch screen keyboard touch screen keyboard includes a QWERTY keyboard, a handwriting panel with a plurality of buttons and a voice input method editor (IME). The handwriting panel is displayed in the electronic device 100 based on the type and content of the application running in the electronic device 100.

FIG. 2A is a block diagram of the electronic device 100, according to an embodiment as disclosed herein. As depicted in the FIG. 2, the electronic device 100 includes an event detection engine 110, a keyboard rendering engine 120, and a communicator 130, a memory 140, a processor 150, a display screen 160.

The event detection engine 110 can be configured to detect occurrence of an input event on one or more applications running in the electronic device 100. The input event can be a touch event, a tap event or the like to provide some input to the electronic device 100.

The keyboard rendering engine 120 can be configured to perform one or more actions for rendering the touch screen keyboard based on the type of application(s) running in the electronic device 100. The keyboard rendering engine 120 can be configured to identify the type of applications running in the electronic device 100 icons and dynamically configures the touch screen keyboard based on the identified type of the one or more applications in response to the input event.

In an embodiment, the keyboard rendering engine 120 can be configured to determine one or more attributes of the touch screen keyboard in accordance with the identified type of the one or more applications. Further, the keyboard rendering engine can be configured to modify the touch screen keyboard with the determined one or more attributes.

In an embodiment, the one or more attributes of the touch screen keyboard includes a layout type, position, number of rows, number of columns, width, height, theme, language preference, mode of the touch screen keyboard and buttons.

In an embodiment, the keyboard rendering engine 120 can be configured to modify the touch screen keyboard with the determined one or more attributes by providing one or more buttons to the touch screen keyboard for interaction with the one or more applications based on the determined one or more attributes. The various actions performed by the keyboard rendering engine 120 for dynamically configuring the touch screen keyboard are explained in conjunction with the figures.

The communicator 130 is configured for communicating internally between internal hardware components and with external devices via one or more networks. The communicator 130 is configured for communicating with the keyboard rendering engine 120 for dynamically configuring the touch screen keyboard in the electronic device 100.

The processor 140 is coupled with the keyboard rendering engine 120, the communicator 130, the memory 150 and the display screen The processor 140 is configured to execute instructions stored in the memory 150 and to perform various actions for configuring the touch screen keyboard.

The memory 150 stores a plurality of applications. Further, the memory 150 includes a plurality of attributes of the touch screen keyboard. The various attributes of the touch screen keyboard are extracted from the memory 150. The memory 150 also stores instructions to be executed by the processor 140. The memory 150 may include non-volatile storage elements.

The various configurations of the touch screen keyboard based on the identified type of applications are displayed to the user on the display screen 160.

Although the FIG. 2A shows various hardware components of the electronic device 100, it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function to perform context based actions in the electronic device 100.

FIG. 2B illustrates various components of a keyboard rendering engine 120 in the electronic device 100, according to an embodiment as disclosed herein. As depicted in the FIG. 2B, the keyboard rendering engine 120 includes a keyboard service 120a, a keyboard request parser 120b, keyboard response composer 120c, attributes database 120d, a keyboard controller 120e and a keyboard view controller 120f.

In an embodiment, the keyboard service 120a can be configured to receive a Keyboard Transfer Protocol (KTP) specifications request from the application running in the electronic device 100. The KTP specifications include keyboard's properties such as height, width, theme, language preference, and addition of new buttons or the like. The KTP is a set of rules for transferring required input method from the application to the keyboard. The KTP defines the set of rules to control configuration or customization of the keyboard. The set of rules may include extra keyboard buttons (i.e., for controlling application functionality), keyboard layout type, keyboard position, number of rows and columns, enabling/disabling special symbols, keyboard width/height, keyboard theme, keyboard language preference, keyboard mode such as a handwriting panel and a voice input method editor (IME), or the like.

In an embodiment, the application running in the background sends KTP request to the keyboard service 120a. The KTP request includes properties of the keyboard to be modified based on the requirements of the application.

The keyboard service 120a runs continuously in the background to receive the KTP request from the application. The keyboard service 120a sends the KTP request of the application to the keyboard parser 120b.

In an embodiment, the keyboard request parser 120b parses the KTP request received from the keyboard service 120a. The KTP request is parsed to identify the attributes of the keyboard based on the application requirements. The keyboard request parser 120b parses the application request in XML format.

The response composer 120c receives the parsed information from the keyboard parser 120b and the parsed information is then composed and the preferences related to the keyboard are modified in accordance with the request of the application. The response composer 120c communicates with attributes database 120d to modify the values of attributes of the keyboard in accordance with the request of the application and receives information of about various attributes from the attributes database 120d. Thus, the response composer 120c generates the required input method using the attribute database 120d. Hence, the response composer 120c checks the attributes database 120d while parsing the application request for interpretation and generating the required keyboard or the input method.

In some embodiments, the attribute data base 120d or the (KTP database) is stored in the electronic device 100. The KTP database 120d can be stored locally integrated with keyboard application In another embodiment, attribute data base 120d can be stored on a cloud network.

In an embodiment, the keyboard rendering engine 120 provides the data in the attribute DB 120d. The keyboard rendering engine 120 defines the protocol rules and stores them in the attribute DB 120d database which is integrated with a keyboard application.

In an embodiment, the keyboard controller 120e can be configured to analyze the type of the application or content of the application running in the electronic device 100. The keyboard controller 120e can be configured to include the one or more buttons on keyboard based on the identified type of the one or more applications. The one or more buttons on the touch screen keyboard are provided based on an identified content of the one or more applications running in the electronic device 100. For example, the one or more buttons can be "review", "Lyrics", "Wiki", "Emoji", and "Collage" which are relevant to the content of the one or more applications running in the electronic device 100.

In some embodiments, the one or more buttons on the touch screen keyboard are configurable to receive one or more inputs to perform one or more actions in the applications in accordance with the one or more inputs, wherein the one or more actions comprises sharing content associated with the applications with other applications.

In an example, when the "Collage" button is clicked, the keyboard view controller 120f detects the input event and the keyboard controller 120e processes the content of the application and extracts screenshots of the content. Further, the collage can be shared with other user through a messaging application or the chat application. Thus, the user can perform various actions using the configurable buttons which are provided along with the keyboard based on the content of the application running in the electronic device 100.

In an embodiment, the keyboard view controller 120f can be configured to modify the view of the keyboard in accordance with the request of the application. The keyboard view controller 120f can be configured to redraw the keyboard based on the modified properties of the keyboard. The keyboard view controller 120f can be configured to render the modified keyboard on the display screen 160.

In an embodiment, the keyboard view controller 120f can be configured to detect or identify the type of keyboard such as a normal keyboard, a split keyboard, a floating keyboard or the like and a position of the keyboard as per the KTP request received from the application.

FIG. 3 is a flow diagram 300 illustrating a method for configuring a touch screen keyboard in an electronic device, according to an embodiment as disclosed herein. At step 302, the method includes Identify a type of one or more applications running in the electronic device 100. At step 304, the method includes receiving an input event on the one or more applications. At step 306, the method includes dynamically configuring the touch screen keyboard based on the identified type of the one or more applications in response to the input event. At step 308, the method includes causing to display the configured touch screen keyboard on the screen of the electronic device 100.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

FIG. 4 is a flow diagram 400 illustrating another method for configuring a touch screen keyboard in the electronic device 100, according to an embodiment as disclosed herein. At step 402, the method includes identifying the type of one or more applications running in the electronic device 100. At step 404, the method includes generating the one or more attributes of the touch screen keyboard based on the identified type of the one or more applications. At step 406, the method includes dynamically configuring the touch screen keyboard by applying the generated one or more attributes.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

FIG. 5 is a flow diagram 500 illustrating a method for modifying the touch screen keyboard with determined attributes, according to an embodiment as disclosed herein. At step 502, the method includes determining the one or more attributes of the touch screen keyboard in accordance with the identified type of the one or more applications. The one or more attributes of the touch screen keyboard includes a layout type, position, number of rows, number of columns, width, height, theme, language preference, mode of the touch screen keyboard and buttons.

At step 504, the method includes modifying the touch screen keyboard with the determined one or more attributes.

In an embodiment, modifying the touch screen keyboard with the determined one or more attributes includes providing one or more buttons to the touch screen keyboard for interaction with the one or more applications based on the one or more attributes. These buttons are provided based on the type of the applications.

In some embodiments, the one or more buttons on the touch screen keyboard are provided based on content of the one or more applications running in the electronic device.

In various embodiments, the one or more buttons on the touch screen keyboard are configurable to receive one or more inputs to perform actions in the applications in accordance with the one or more inputs. The various actions which can be performed using the buttons are described in conjunction with figures.

In an embodiment, modifying the touch screen keyboard includes splitting the touch screen keyboard to at least first and second keyboard portions. Further, a first portion of the touch screen keyboard and a second portion of the touch screen keyboard are displayed in the electronic device 100 based on the identified objects (for example, humans, buildings, trees, any real world objects or the like).

In an embodiment, modifying the touch screen keyboard includes receiving a request from the one or more applications including a position of the touch screen keyboard. Further, the touch screen keyboard is dynamically modified based on the position received in the request.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

FIGS. 6A and 6B are example illustrations in which the touch screen keyboard is displayed along with controlling functions associated with the applications running in the electronic device 100, according to an embodiment as disclosed herein. As depicted in the FIG. 6A, the user is chatting on a chat application while watching a multimedia content in a video application. When the user interacts with the chat application, the touch screen keyboard is invoked. Further, the video application requests for a customizable row with basic functionalities of the video application (i.e., play, stop, pause) through the touch screen keyboard. Thus, the user can interact with the video through the touch screen keyboard. The user can play, pause, and stop the video without hiding the touch screen keyboard and continues to chat in the chat application.

As depicted in the FIG. 6B, the user is chatting on a chat application while viewing an image in a gallery application. When the user interacts with the chat application, the touch screen keyboard is invoked Further, the video application requests for a customizable row with basic functionalities of the gallery applications (i.e., slide show mode, zoom-in, zoom-out or the like). The user can interact with the gallery applications using gallery control functions without hiding the touch screen keyboard and continues to chat in the chat application.

FIG. 7 is an example illustration in which the touch screen keyboard is displayed in accordance with a theme of the application, according to an embodiment as disclosed herein. As depicted in the FIG. 7, the touch screen keyboard is displayed in the electronic device 100 in accordance with the theme of the application. When the application is launched in the electronic device 100, the application requests the keyboard rendering engine 120 to change the theme of the touch screen board along with various attributes such as height, width or the like. For example, the application may request for a blue theme with specific height and width. Thus, the keyboard rendering engine 120 dynamically configures the touch screen keyboard in accordance with the request of the application and renders the keyboard with the blue theme.

FIG. 8 is an example illustration in which the touch screen keyboard is displayed in accordance with a language of the application, according to an embodiment as disclosed herein. In an embodiment, the application can request or set the language preference of the touch screen keyboard. As depicted in the FIG. 8, the touch screen keyboard is displayed in the electronic device 100 in accordance with the language of the application which is being accessed at the electronic device 100. In the FIG. 8, a Hindi news application is being accessed at the electronic device. When the user intends to search for news in the search bar, automatically the Hindi news application invokes the touch screen keyboard in Hindi language.

FIGS. 9A and 9B are example illustrations in which the touch screen keyboard is displayed as a split keyboard and a floating keyboard, according to an embodiment as disclosed herein. As depicted in the FIG. 9A, the user is chatting while watching news. When the user interacts with the chat application through the text field, the touch screen keyboard is invoked. In this scenario, the application requests the keyboard rendering engine 120 to split the touch screen keyboard. The keyboard rendering engine 120 renders the first portion of the touch screen keyboard on left and the second portion of the touch screen keyboard on right as shown in the FIG. 9A. Thus, the keyboard rendering engine 120 renders the touch screen keyboard based on the position as requested by the application which is running in the electronic device 100.

As depicted in the FIG. 9B, the video application is running in the electronic device 100 and the user is searching for other playing contents. The video application requests the keyboard rendering engine 120 to render the touch screen keyboard at the centre. The keyboard rendering engine 120 analyzes the content/objects in the video application and renders the floating keyboard at the centre as shown in the FIG. 9B.

FIGS. 10A and 10B are example illustrations of positioning the touch screen keyboard based on content of the application, according to an embodiment as disclosed herein. As depicted in the FIG. 10A, the video application is running in the electronic device 100 and the user is searching for another video. In this scenario, the video application requests the keyboard rendering engine 120 to render the touch screen keyboard at the bottom position and the touch screen keyboard is rendered at the bottom position as shown in the FIG. 10A.

As depicted in the FIG. 10B, the video application is running in the electronic device 100 and the user is searching for another content. In the video application, the singer is singing at the right side. In this scenario, the video application requests the keyboard rendering engine 120 to render the touch screen keyboard on the left side and the touch screen keyboard is rendered on the left side as per the request from the video application.

FIG. 11 is an example illustration in which a video link is shared through a chat application using one or more buttons on the touch screen keyboard, according to an embodiment as disclosed herein. As depicted in the FIG. 11, the user is chatting on a chat application while accessing the video application. In this scenario, the video application can request the keyboard rendering engine 120 to provide buttons along with the touch screen keyboard. Thus, the keyboard rendering engine 120 provides buttons on the touch screen keyboard based on the identified content of application running in the electronic device. The buttons on the touch screen keyboard are configurable to receive inputs from the user to perform actions in the applications in accordance with the user inputs. In this scenario, when the user clicks on "Link" button, the link of the video is shared through the chat application. Thus, the buttons on the touch screen keyboard provide various functionalities based on the content of the application.

FIG. 12 is an example illustration in which a collage of images is shared through a chat application using one or more buttons on the touch screen keyboard, according to an embodiment as disclosed herein. As depicted in the FIG. 12, the user is chatting on a chat application while accessing the video application. In this scenario, the video application can request the keyboard rendering engine 120 to provide buttons along with the touch screen keyboard. When the user clicks on "collage" button, images from the video are extracted to generate a collage. Further, the user can share the collage through the chat application as shown in the FIG. 12.

FIGS. 13A and 13B are example illustrations in which a plurality of emoticons are provided on interaction with one or more buttons on the touch screen keyboard, according to an embodiment as disclosed herein. As depicted in the FIG. 13A, the user is chatting on a chat application while accessing the video application. In this scenario, the video application can request the keyboard rendering engine 120 to provide buttons along with the touch screen keyboard. When the user click on the "Emoji" button, the keyboard rendering engine 120 analyzes the content of the video application and generates the "Emojis" or "Emoticons" relevant to the video as shown in the FIG. 13B.

FIG. 14 is a sequence diagram illustrating various steps involved in providing a configurable touch screen keyboard based on application running in the electronic device, according to an embodiment as disclosed herein. Initially, the user opens (1402) the application. The application sends (1404) Keyboard Transfer Protocol (KTP) specifications to the keyboard service 120a. The KTP specifications include keyboard's properties such as height, width, theme, language preference, and addition of new buttons or the like.

Further, the keyboard service 120a sends (1406) the KTP specifications to the keyboard response composer 120c. The keyboard response composer 120c includes a parsing engine to parse (1408) the KTP specifications. The keyboard response composer 120c sends (1410) a response to the keyboard view controller 120f. The keyboard view controller 120f customizes (1412) the keyboard in accordance with the request from the application.

The application sends (1414) a request to launch the keyboard, when the user searches for a content through a search field. The keyboard view controller 120f shows (1416) a customized keyboard to the application.

FIG. 15 is a sequence diagram illustrating various steps involved in configuring the position of the touch screen keyboard, according to an embodiment as disclosed herein. Initially, the user opens (1502) the application. The application sends (1504) KTP specifications to the keyboard service 120a. The KTP specifications include keyboard's properties such as height, width, theme, language preference, and addition of new buttons or the like.

Further, the Keyboard service 120a sends (1506) the KTP specifications to the keyboard response composer 120c. The keyboard response composer 120c includes a parsing engine to parse (1508) the KTP specifications. The keyboard response composer 120c composes (1510) a response and sends (1512) the response to the keyboard controller 120e. The keyboard controller 120e detects (1514) the keyboard type and position. The keyboard controller 120e sends (1516) information about keyboard type and position to the keyboard view controller 120f. The keyboard view controller 120f customizes (1518) the keyboard in accordance with the request from the application.

The application sends (1520) a request to launch the keyboard, when the user searches for a content through a search field. The keyboard view controller 120f sends (1522) a customized keyboard to the application.

FIG. 16 is a sequence diagram illustrating various steps involved in providing a plurality of emoticons on interaction with one or more buttons on the touch screen keyboard, according to an embodiment as disclosed herein. Initially, the user opens (1602) the application. The application sends (1604) KTP specifications to the keyboard service 120a. The keyboard service 120a sends (1606) customisations to the keyboard view controller 120f. The keyboard view controller 120f customizes (1608) the keyboard in accordance with the request from the application.

The application sends (1610) a request to launch the keyboard, when the user searches for a content through a search field. The keyboard view controller 120f sends (1612) a customized keyboard (which includes various buttons such as "review", "Lyrics", "Wiki", "Emoji" along with the keyboard buttons.

When the "Emoji" button is clicked (1614), the Keyboard view controller 120f detects the input event and sends (1616) a request for content analysis to the keyboard controller 120e. The keyboard controller 120e analyzes (1618) the content of the application and generates emoticons based on the content of the application. Further, the keyboard controller 120e sends (1620) the emoticons to the keyboard view controller. Further, the emoticons are shown (1622) to the user.

FIG. 17 is a sequence diagram illustrating various steps involved in sharing a collage of images through a chat application using one or more buttons on the touch screen keyboard, according to an embodiment as disclosed herein. Initially, the user opens (1702) the application. The application sends (1704) KTP specifications to the keyboard service 120a. The keyboard service 120a sends (1706) customisations to the keyboard view controller 120f. The keyboard view controller 120f customizes (1708) the keyboard in accordance with the request from the application.

The application sends (1710) a request to launch the keyboard, when the user searches for a content through a search field. The keyboard view controller 120f sends (1712) a customized keyboard (which includes various buttons such as "Collage", "review", "Lyrics", "Wiki", "Emoji" along with the keyboard buttons.

When the "Collage" button is clicked (1714), the Keyboard view controller 120f detects the input event and sends (1716) a request for collage to the keyboard controller 120e. The keyboard controller 120e processes (1718) the content of the application and extracts screenshots of the content. Further, the keyboard controller 120e sends (1720) the generated collage to the keyboard view controller 120f. Further, the collage is shared (1722) with other user through a messaging application or the chat application.

The embodiments disclosed herein can be implemented through at least one software program running on at least one hardware device and performing network management functions to control the elements. The elements shown in FIGS. 1 through 17 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for configuring a touch screen keyboard in an electronic device, the method comprising:
   identifying a first application and a second application which are running in the electronic device, wherein the first application and the second application are different types of applications;
   receiving an input event from at least one of the first application or the second application;
   in response to the input event, modifying the touch screen keyboard based on the different types of applications of the first application and the second application to include at least one extra button, which provides a function associated with the first application and the second application, for sharing content of the first application with the second application; and
   displaying the modified touch screen keyboard on a screen of the electronic device.

2. The method of claim 1, wherein the touch screen keyboard comprises at least one of a QWERTY keyboard, a handwriting panel with a plurality of buttons, or a voice input method editor (IME).

3. The method of claim 1, wherein generating the touch screen keyboard based on the different types of applications of the first application and the second application in response the input event comprises:
   determining at least one attribute of the touch screen keyboard in accordance with the first application and the second application; and
   modifying the touch screen keyboard with the determined at least one attribute.

4. The method of claim 3, wherein the at least one attribute of the touch screen keyboard comprises at least one of a layout type, position, number of rows, number of columns, width, height, theme, language preference, mode of the touch screen keyboard, or buttons.

5. The method of claim 3, wherein modifying the touch screen keyboard includes:
   splitting the touch screen keyboard to at least a first and a second keyboard portions; and
   causing to display the first and the second keyboard portions based on identified objects in the first application and the second application.

6. The method of claim 3, wherein modifying the touch screen keyboard with the determined at least one attribute comprises:
   receiving a request from the at least one of the first application or the second application including a position of the touch screen keyboard;
   dynamically modifying the touch screen keyboard based on the position received in the request; and
   dynamically causing to display the touch screen keyboard.

7. The method of claim 1, wherein the at least one extra button on the touch screen keyboard is provided based on identified content of the first application and the second application running in the electronic device.

8. The method of claim 7, wherein the at least one extra button on the touch screen keyboard is configurable to receive one or more inputs to perform at least one action in the first application and the second application in accordance with the one or more inputs, wherein the at least one action comprises sharing content associated with the first application with the second application.

9. A method for configuring a touch screen keyboard in an electronic device, the method comprising:
    identifying a first application and a second application which are running in the electronic device, wherein the first application and the second application are different types of applications;
    determining at least one attribute of the touch screen keyboard based on the different types of applications of the first application and second application;
    in response to determining the at least one attribute of the touch screen keyboard, modifying the touch screen keyboard based on the at least one attribute of the touch screen keyboard to include at least one extra button, which provides a function associated with the first application and the second application, for sharing content of the first application with the second application; and
    displaying the modified touch screen keyboard on a screen of the electronic device.

10. The method of claim 9, wherein the at least one attribute of the touch screen keyboard comprises at least one of layout type, position, number of rows, number of columns, width, height, theme, language preference, mode of the touch screen keyboard, or and buttons of the touch screen keyboard.

11. An electronic device for configuring a touch screen keyboard, the electronic device comprising:
    a memory;
    a processor;
    a display; and
    a keyboard rendering engine coupled to the memory and the processor, configured to:
        identify a first application and a second application running in the electronic device, wherein the first application and the second application are different types of applications;
        receive an input event from at least one of the first application or the second application;
        modify, in response to the input event, the touch screen keyboard based on the different types of applications of the first application and the second application to include at least one extra button, which provides a function associated with the first application and the second application, for sharing content of the first application with the second application; and
        display the modified touch screen keyboard on the display.

12. The electronic device of claim 11, wherein the touch screen keyboard comprises at least one of a QWERTY keyboard, a handwriting panel with a plurality of buttons, or a voice input method editor (IME).

13. The electronic device of claim 11, wherein the processor is further configured to:
    determine at least one attribute of the touch screen keyboard in accordance with the first application and the second application; and
    modify the touch screen keyboard with the determined at least one attribute.

14. The electronic device of claim 13, wherein the at least one attribute of the touch screen keyboard comprises at least one of a layout type, position, number of rows, number of columns, width, height, theme, language preference, mode of the touch screen keyboard, or buttons.

15. The electronic device of claim 11, wherein the at least one extra button on the touch screen keyboard is provided based on an identified content of the first application and the second application running in the electronic device.

16. The electronic device of claim 15, wherein the at least one extra button on the touch screen keyboard is configurable to receive one or more inputs to perform at least one action in the first application and the second application in accordance with the one or more inputs, wherein the at least one action comprises sharing content associated with the first application with the second application.

* * * * *